US009837074B2

(12) United States Patent
Saraya et al.

(10) Patent No.: US 9,837,074 B2
(45) Date of Patent: Dec. 5, 2017

(54) INFORMATION EXCHANGE DURING AUDIO CONVERSATIONS

(71) Applicant: International Business Machines Corporation, Armonk, NY (US)

(72) Inventors: Siddharth K. Saraya, Raniganj (IN); Alok K. Singh, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 1 day.

(21) Appl. No.: 14/923,550

(22) Filed: Oct. 27, 2015

(65) Prior Publication Data
US 2017/0116981 A1    Apr. 27, 2017

(51) Int. Cl.
G10L 15/08    (2006.01)
G10L 15/26    (2006.01)
G10L 15/22    (2006.01)

(52) U.S. Cl.
CPC ........... *G10L 15/08* (2013.01); *G10L 15/22* (2013.01); *G10L 15/26* (2013.01); *G10L 15/265* (2013.01); *G10L 2015/088* (2013.01); *G10L 2015/223* (2013.01)

(58) Field of Classification Search
CPC .......... G10L 15/30; G10L 15/26; H04L 63/10
See application file for complete search history.

(56) References Cited

U.S. PATENT DOCUMENTS 7,844,460 B2    11/2010    Charlier et al.
7,970,909 B1*    6/2011    Cox ................... H04L 67/14
                                                  709/203
8,494,851 B2    7/2013    DeLuca et al.
8,537,980 B2    9/2013    Frazier et al.
2008/0126087 A1    5/2008    Chou
2008/0275701 A1    11/2008    Wu et al.
2009/0060156 A1    3/2009    Burckart et al.
2009/0232288 A1    9/2009    Forbes et al.
2009/0310762 A1*    12/2009    Velius ............... H04M 3/42204
                                                       379/93.01

(Continued)

FOREIGN PATENT DOCUMENTS

EP    2294800 A1    3/2011

*Primary Examiner* — Douglas Godbold
*Assistant Examiner* — Mark Villena
(74) *Attorney, Agent, or Firm* — Brown & Michaels, PC; Maeve Carpenter (57) ABSTRACT

A method of sharing informational data during an audio conversation between a user using a first device computer and at least one recipient is disclosed. The first device computer: converting audio of the audio conversation to text; identifying specific words or phrases in the text; and determining whether the specific words or phrases are a request for information from the user by a recipient. If the first device computer determines that the specific words or phrases are a request for information from the user by the recipient, the first device computer: searching for the information requested within a repository; if the information requested is present, determining whether the information requested is sharable with the recipient based on categorization of the information requested; and if the information requested is sharable based on categorization of the information, transferring the information to the recipient.

18 Claims, 4 Drawing Sheets

(56) References Cited

U.S. PATENT DOCUMENTS

| | | | |
|---|---|---|---|
| 2010/0088100 A1* | 4/2010 | Lindahl | G10L 15/30 704/270.1 |
| 2011/0268260 A1* | 11/2011 | Madhavapeddi | G06Q 10/00 379/88.13 |
| 2012/0072971 A1* | 3/2012 | Zhang | H04W 8/186 726/4 |
| 2012/0259917 A1* | 10/2012 | Tyroler | H04L 51/22 709/204 |
| 2013/0144610 A1 | 6/2013 | Gordon et al. | |
| 2013/0157697 A1* | 6/2013 | Kang | H04W 4/02 455/457 |
| 2013/0204622 A1 | 8/2013 | Lu et al. | |
| 2013/0317827 A1* | 11/2013 | Fu | G10L 17/00 704/273 |
| 2015/0135336 A1* | 5/2015 | Arasavelli | H04B 7/26 726/29 |
| 2015/0363554 A1* | 12/2015 | Farrell | G06F 19/322 705/3 |

* cited by examiner

INFORMATION EXCHANGE DURING AUDIO CONVERSATIONS

BACKGROUND

The present invention relates to analysis of audio conversations, and more specifically to dynamically analyzing conversations for requests for information to be sent or exchanged during the conversation. The information requested may be sent during the audio conversation based on categorization of the requested information.

During an audio conversation, a request for information from one or more of the participants may take place. Fulfilling the request often requires the user to stop the conversation, either to search for the information, or to find a piece of paper and writing utensil to take down the information received. This interruption of the audio conversation can be cumbersome to the users involved in the audio conversation.

It is well known to the art to categorize data based on whether the owner of the data wishes to share the data, and with whom. For example, when a picture is uploaded or a post is made to a social networking site, the picture or post is categorized as public, or private, or shared with friends or friends of friends, and so on. In a commercial context, data might be categorized as confidential, or trade secret, or to be shared only within a company or only with customers with whom the company has a Non-Disclosure Agreement (NDA). The government has long had many different classifications of data from public through Top Secret.

SUMMARY

According to one embodiment of the present invention, a method of sharing informational data during an audio conversation between a user using a first device computer and at least one recipient is disclosed. The method comprising the steps of: the first device computer converting audio of the audio conversation to text; the first device computer identifying words or phrases in the text; and the first device computer determining whether the words or phrases are a request for information from the user by a recipient. If the first device computer determines that the words or phrases are a request for information from the user by the recipient, the first device computer: searching for the information requested within a repository; if the information requested is present, determining whether the information requested is sharable with the recipient based on categorization of the information requested and a determination of an identity of the at least one recipient; and if the information requested is sharable based on categorization of the information, transferring the information to the recipient.

According to another embodiment of the present invention, a computer program product for sharing informational data during an audio conversation between a user using a first device computer is disclosed. The first device computer comprising at least one processor, one or more memories, one or more computer readable storage media and at least one recipient, the computer program product comprising a computer readable storage medium having program instructions embodied therewith. The program instructions executable by the computer to perform a method comprising: converting, by the first device computer, audio of the audio conversation to text; identifying, by the first device computer, words or phrases in the text; and determining, by the first device computer, whether the words or phrases are a request for information from the user by a recipient. If the first device computer determines that the words or phrases are a request for information from the user by the recipient, the first device computer: searching for the information requested within a repository; if the information requested is present, determining whether the information requested is sharable with the recipient based on categorization of the information requested and a determination of an identity of the at least one recipient; and if the information requested is sharable based on categorization of the information, transferring the information to the recipient.

According to another embodiment of the present invention, a computer system for sharing informational data during an audio conversation between a user using a first device computer. The first device computer comprising a computer comprising at least one processor, one or more memories, one or more computer readable storage media having program instructions executable by the computer to perform the program instructions comprising: converting, by the first device computer, audio of the audio conversation to text; identifying, by the first device computer, words or phrases in the text; and determining, by the first device computer, whether the words or phrases are a request for information from the user by a recipient. If the first device computer determines that the words or phrases are a request for information from the user by the recipient, the first device computer: searching for the information requested within a repository; if the information requested is present, determining whether the information requested is sharable with the recipient based on categorization of the information requested and a determination of an identity of the at least one recipient; and if the information requested is sharable based on categorization of the information, transferring the information to the recipient.

DETAILED DESCRIPTION

In an illustrative embodiment of the present invention, it is recognized that data on a device computer is categorized by the user of the device computer based on who the data can be shared with and what specific data is to be shared. The content of an audio conversation between the user and another user who is a potential recipient of the data is analyzed to determine what data is being requested. The data of the device is searched for the requested data. If data matching the request is found, the categorization of the data is checked to determine whether the data may be shared with the other user. If the data is categorized such that the data can be shared with the recipient, the data is transferred to the device of the other user without interaction from the user of the device computer.

In an illustrative embodiment of the present invention, it is recognized that the data may be transferred with or without the use of Internet connectivity.

It is recognized that the method of an embodiment of the present invention provides a capability to verbalize information automatically in order to transfer information from one device to another while an audio conversation is taking place.

It is also recognized that the method of an embodiment of the present invention provides the ability to transfer information from one device to another and store the information on the other device, without requiring the user of either device to take any action to initiate the transfer or storage.

Figure 1:
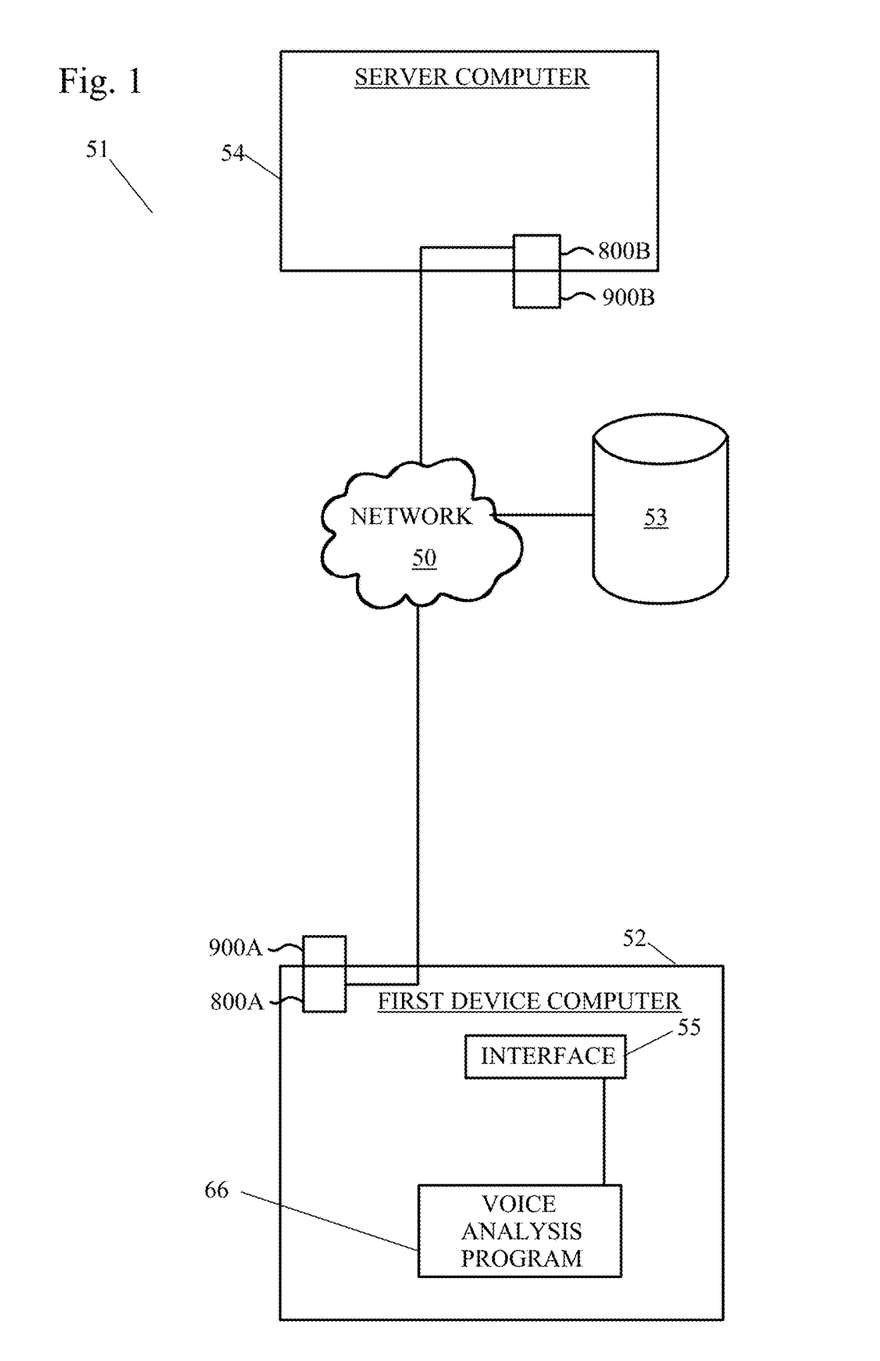
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a first device computer 52 a repository 53, and a server computer 54 connect to network 50. In other exemplary embodiments, network data processing system 51 may include additional client or device computers, storage devices or repositories, server computers, and other devices not shown.

Figure 3:
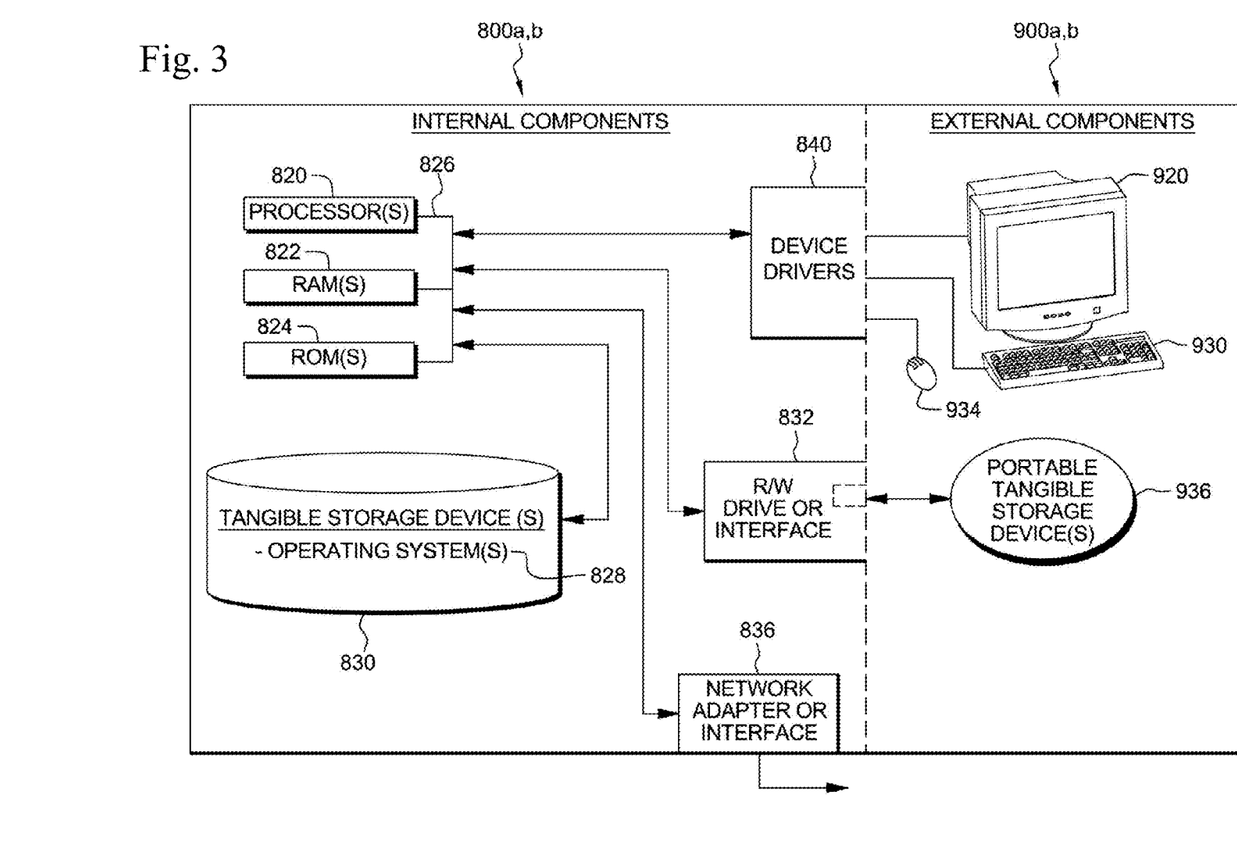
FIG. 3 illustrates internal and external components of a client or device computer and a server computer in which illustrative embodiments may be implemented.

The first device computer 52 includes a set of internal components 800a, and a set of external components 900a further illustrated in FIG. 3. The first device computer 52 may be, for example, a mobile device, a cell phone, a smart phone, a personal digital assistant, a netbook, a laptop computer, a tablet computer, or any other type of computing device that includes a microphone and a speaker for both receiving and playing audio.

The first device computer 52 preferably includes a voice analysis program 66 and an interface 55. The interface 55 may accept commands and data entry from a user. The interface can be, for example, a command line interface, a graphical user interface (GUI), or a web user interface (WUI) through which a user can access data and any associated categorization of the data on the first device computer 52, and the voice analysis program 66.

Server computer 54 includes a set of internal components 800b and a set of external components 900b illustrated in FIG. 3. In the depicted example, server computer 54 provides information, such as boot files, operating system images, and applications to the first device computer 52. Server computer 54 can compute the information locally or extract the information from other computers on network 50.

Program code and programs such as a voice analysis program 66 may be stored on at least one of one or more computer-readable tangible storage devices 830 shown in FIG. 3, on at least one of one or more portable computer-readable tangible storage devices 936 as shown in FIG. 3, on repository 53 connected to network 50, or downloaded to a data processing system or other device for use. For example, program code and programs such as the voice analysis program 66 may be stored on at least one of one or more tangible storage devices 830 on server computer 54 and downloaded to the device computer 52. In another embodiment, the voice analysis program 66 may also be present on a second device computer, which is connected to the first device computer for an audio conversation.

Alternatively, server computer 54 can be a web server, and the program code and programs such as the voice analysis program 66 may be stored on at least one of the one or more tangible storage devices 830 on server computer 54 and accessed on the first device computer 52. In another embodiment, the voice analysis program may be stored on at least one of the one or more tangible storage devices on server computer 54 and accessed on a second device computer. In other exemplary embodiments, the program code and programs such as a voice analysis program 66 may be stored on at least one of one or more computer-readable tangible storage devices 830 on server computer 54 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

Figure 2A:
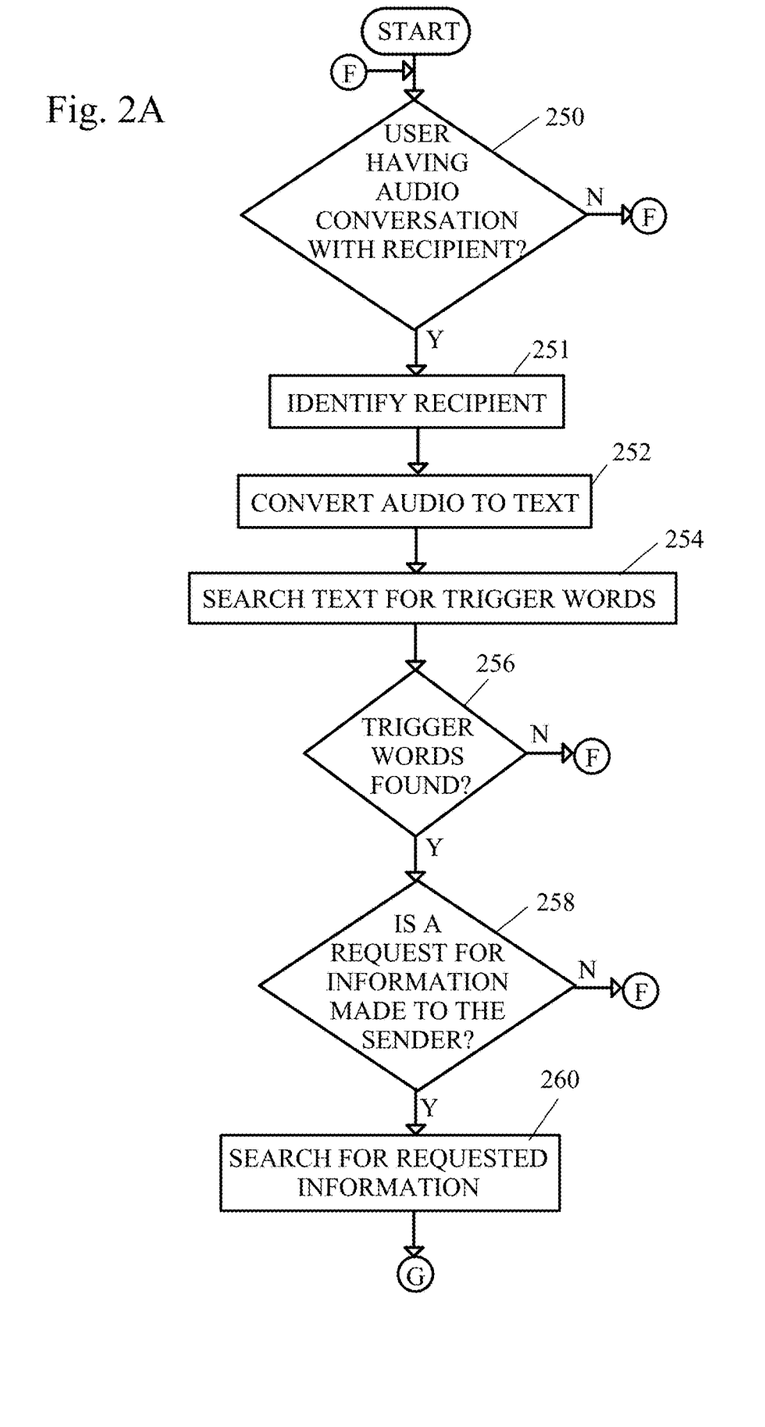
FIGS. 2A-2B show a flow diagram of a method of sharing categorized information and/or receiving information during an audio conversation, in accordance with embodiment of the present invention.
Figure 2B:
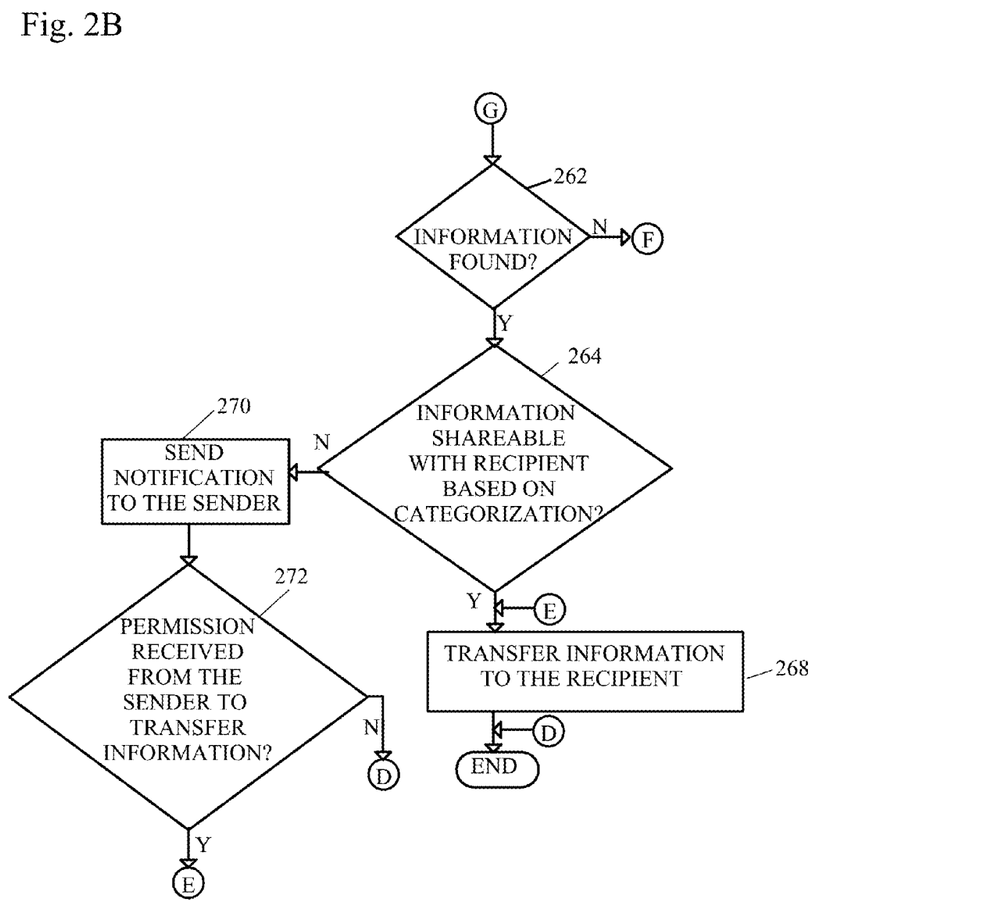

FIGS. 2A-2B show a flow diagram of a method of sharing categorized information and/or receiving information during an audio conversation.

A first device computer 52 determines if a user or sender is having an audio conversation with another user or recipient or a second device computer (step 250), for example through a voice analysis program 66. If the user (e.g sender) is not having an audio conversation with another user (e.g. recipient) (step 250—No—connector (F)), the method restarts (F) or the method ends.

If the user or sender is having an audio conversation with another user or a recipient (step 250—Yes), the recipient or another user is identified (step 251). The recipient or another user may be identified using a conventional voice recognition program, identifying the identity of a person through voice biometrics or voice recognition. The identification of the recipient or another use may be text-dependent or text-independent, where acoustics and speech analysis techniques may be used. Alternatively, the recipient or another user may be identified by data associated with the audio conversation, such as a telephone number.

The audio of the conversation between the users is converted to text (step 252). The audio may be converted to text though the use of an audio transcription program or other software capable of converting audio files to text.

The text of the audio conversation is then searched for specific trigger words or phrases (step 254), for example by the voice analysis program 66 of the first device computer 52. The specific trigger words or phrases may be found using a full text search, text mining, or other search method. These words or phrases represent a request for information. In various embodiments of the present invention, the words or phrases might correspond to or identify information which might be requested, or may be predetermined, or derived from the information in a repository, or set by the sender.

If a specific word or phrase is not present in the text (step 256—No), the method returns (F) to step 250 of determining whether the sender is having an audio conversation.

If a specific word or phrase is present in the text which represents a request for information (step 256—Yes), and the word or phrase was not a request for information from the party to whom the user is speaking (e.g. the recipient) (step 258—No), the method loops back to step 250 (connector (F)). Otherwise, first device computer searches for the requested information in the repository (step 260).

If the information is not found (step 262—No), the method returns to step 250 (connector (F)) of determining whether the sender is having an audio conversation with a recipient. Alternatively, a notification may be sent to the user (e.g. sender) of the first device computer and/or the user (e.g. recipient) of the second device computer indicating that no information was available and/or shareable.

If the information is found in the repository by the first device computer (step 262—Yes), the first device computer checks the categorization of the information to see if the information is sharable with the party which requested the information (step 264). The categorization may be predetermined by the user of the first device computer or predetermined through an overall policy pertaining to the user of the first device (e.g. company policy). The categorization may be based on the type of information and the recipient in which the user is speaking with, as not all information can be shared with all recipients.

If the information is not shareable (step 264—No), the first device computer sends a notification to the sender (step 270). Depending on the policies set by the user (e.g. sender) or the organization to which the user belongs or is employed, or the owner of the data, the notification might be a message that information was requested which cannot be sent, and method might end or loop back to step 250 at that point. Alternatively, or if the policies permitted, the notification could ask the user (e.g. sender) for permission to send the information in violation of the categorization rules. In some cases, the decision of whether to ask for permission or not might depend on the level of categorization—for example, if a categorization permitted sharing only with customers with a signed NDA, the notification might ask the user (e.g. sender) if the recipient had an NDA. If permission is received from the user (e.g. sender) to share the information despite the categorization (step 272), the information is transferred to the second device computer (step 268) and the method returns (connector (F)) to step 250 of determining whether the user (e.g. sender) is having an audio conversation, or the method ends.

If the information is shareable (step 264—Yes), the first device computer transfers the information to the second device computer of the recipient (step 268) and the method ends.

The transfer of the information may take place by through a network, local or not, through a service provider, for example by short message service (SMS) or multi-media message (MMS), or the device computer with the information may verbalize the information during the audio conversation to the other user (e.g. recipient) and their device computer. The verbalization of the information may be at a level where all users on the call can hear or the information may be verbalized at a low level to a specific user. In the case of transfer failure through one medium, another medium would be used, based on user preferences.

In a first example, two users are having an audio conversation, with a first user (e.g. sender) using a first device computer and a second user (e.g. recipient) using a second device computer. If during the audio conversation, the second user says "send me specifications of product 123". The first device computer, through detection of the specific words or phrases "send me specifications" during the conversation, searches for the specifications for product 123 in a repository. When a specifications document is found, the categorization of information is checked. In this case, the categorization of the product specification indicates that the information is for public distribution, and the first device computer sends the information to the second device computer while the audio conversation between the users continues.

In some cases, the information might be superimposed on or inserted into the audio communications—for example, if the second user said "what is the price for product 123", the first device computer might recognize the word or phrase "what is the price", and insert a verbal "the price is two thousand dollars per gross" into the audio conversation.

In another example, when the second user says "send me specifications of product 123", the first device computer finds that the categorization of the product specification indicates that the information is only to be shared with customers having a signed NDA. Since this information was not freely sharable, a notification may be sent to the first user regarding the request for information made by the second user, for example by displaying the text "Does the customer have a signed NDA?" on the first device. The first user could grant permission for the second user to receive the information by saying or clicking on "yes", or the first user could deny permission.

If the user denies permission, the first device computer may send a notification to the second device computer stating that the information is unavailable.

FIG. 3 illustrates internal and external components of first device computer 52 and server computer 54 in which illustrative embodiments may be implemented. In FIG. 3, first device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and voice analysis program 66 are stored on one or more of the computer-readable tangible storage devices 830 for execution by one or more of the processors 820 via one or more of the RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Voice analysis program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Voice analysis program 66 can be downloaded to the first device computer 52 and the server computer 54 from an external computer via a network (for example, the Internet, a local area network or other, wide area network) and network adapter or interface 836. In an alternate embodiment, the voice analysis program 66 an be downloaded to a second device computer and the server computer 54 from an external computer via a network (for example, the Internet, a local area network or other, wide area network) and network adapter or interface 836. From the network adapter or interface 836, voice analysis program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Voice analysis program 66 can be written in various programming languages including low-level, high-level, object-oriented or non object-oriented languages. Alternatively, the functions of a voice analysis program 66 can be implemented in whole or in part by computer circuits and other hardware (not shown).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of sharing informational data during an audio conversation between a user using a first device computer and a plurality of recipients, comprising the steps of:
   the first device computer converting audio of the audio conversation to text;
   the first device computer identifying words or phrases in the text; and
   the first device computer determining whether the words or phrases are a request for information from the user by a first recipient of the plurality of recipients, and if the first device computer determines that the words or phrases are a request for information from the user by the first recipient, the first device computer:
   searching for the information requested within a repository;
   if the information requested is present, determining whether the information requested is sharable with the first recipient based on categorization of the information requested and determination of an identity of the first recipient and remaining recipients of the plurality of recipients participating in the audio conversation between the user and the plurality of recipients; and
   if the information requested is sharable based on categorization of the information, transferring the information to the first recipient verbally during the audio conversation between the user and the plurality of recipients at a low volume level audible to only the first recipient.

2. The method of claim 1, wherein the information is transferred to the recipient as data simultaneous with the audio conversation.

3. The method of claim 1, wherein if the information requested is not sharable based on categorization of the information, the first device computer sending a notification to the user.

4. The method of claim 3, wherein the notification requests permission from the user to send the requested information to the recipient.

5. The method of claim 1, wherein words or phrases in the text are identified by a full text search.

6. The method of claim 1, wherein the determination of the identity of the plurality of recipients is by voice recognition.

7. A computer program product for sharing informational data during an audio conversation between a user using a first device computer, the first device computer comprising at least one processor, one or more memories, one or more non-transitory computer readable storage media and a plurality of recipients, the computer program product comprising a non-transitory computer readable storage medium having program instructions embodied therewith, the program instructions executable by the computer to perform a method comprising:
   converting, by the first device computer, audio of the audio conversation to text;
   identifying, by the first device computer, words or phrases in the text; and
   determining, by the first device computer, whether the words or phrases are a request for information from the user by a first recipient of the plurality of recipients, and if the first device computer determines that the words or phrases are a request for information from the user by the first recipient, the first device computer:
   searching for the information requested within a repository;
   if the information requested is present, determining whether the information requested is sharable with the first recipient based on categorization of the information requested and determination of an identity of the first recipient and remaining recipients of the plurality of recipients participating in the audio conversation between the user and the plurality of recipients; and
   if the information requested is sharable based on categorization of the information, transferring the information to the first recipient verbally during the audio conversation between the user and the plurality of recipients at a low volume level audible to only the first recipient.

8. The computer program product of claim 7, wherein the information is transferred to the recipient as data simultaneous with the audio conversation.

9. The computer program product of claim 7, wherein if the information requested is not sharable based on categorization of the information, sending, by the first device computer, a notification to the user.

10. The computer program product of claim 9, wherein the notification requests permission from the user to send the requested information to the recipient.

11. The computer program product of claim 7, wherein words or phrases in the text are identified by a full text search.

12. The computer program product of claim 7, wherein the determination of the plurality of recipients is by voice recognition.

13. A computer system for sharing informational data during an audio conversation between a user using a first device computer and a plurality of recipients, the first device computer comprising a computer comprising at least one processor, one or more memories, one or more computer readable storage media having program instructions executable by the computer to perform the program instructions comprising:
   converting, by the first device computer, audio of the audio conversation to text;
   identifying, by the first device computer, words or phrases in the text; and determining, by the first device computer, whether the words or phrases are a request for information from the user by a first recipient of the plurality of recipients, and if the first device computer determines that the words or phrases are a request for information from the user by the first recipient, the first device computer:

searching for the information requested within a repository;

if the information requested is present, determining whether the information requested is sharable with the first recipient based on categorization of the information requested and determination of an identity of the first recipient and remaining recipients of the plurality of recipients participating in the audio conversation between the user and the plurality of recipients; and if the information requested is sharable based on categorization of the information, transferring the information to the first recipient verbally during the audio conversation between the user and the plurality of recipients at a low volume level audible to only the first recipient.

14. The computer system of claim 13, wherein the information is transferred to the recipient by the first device computer verbalizing the information during the audio conversation between the user and the recipient.

15. The computer system of claim 13, wherein the information is transferred to the recipient as data simultaneous with the audio conversation.

16. The computer system of claim 13, wherein if the information requested is not sharable based on categorization of the information, sending, by the first device computer, a notification to the user.

17. The computer system of claim 16, wherein the notification requests permission from the user to send the requested information to the recipient.

18. The computer system of claim 13, wherein the determination of the plurality of recipients is by voice recognition.

* * * * *